(12) United States Patent
Parla et al.

(10) Patent No.: US 12,657,310 B2
(45) Date of Patent: Jun. 16, 2026

(54) LLM TECHNOLOGY FOR POLYMORPHIC GENERATION OF SAMPLES OF MALWARE FOR MODELING, GROUPING, DETONATION AND ANALYSIS

(71) Applicant: Cisco Technology, Inc., San Jose, CA (US)

(72) Inventors: Vincent Parla, North Hampton, NH (US); Andrew Zawadowskiy, Hollis, OH (US); Blake Anderson, Chapel Hill, NC (US); Hugo Mike Latapie, Long Beach, CA (US); Oleg Bessonov, San Jose, CA (US); David Arthur McGrew, Poolesville, MD (US); Michael Roytman, Swannanoa, NC (US); Tian Bu, Basking Ridge, NJ (US); William Michael Hudson, Jr., Cary, NC (US); Nancy Cam-Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 18/360,676

(22) Filed: Jul. 27, 2023

(65) Prior Publication Data

US 2024/0333747 A1 Oct. 3, 2024

Related U.S. Application Data

(60) Provisional application No. 63/493,552, filed on Mar. 31, 2023.

(51) Int. Cl.
*G06F 21/00* (2013.01)
*G06F 11/34* (2006.01)
(Continued)

(52) U.S. Cl.
CPC ........ *G06F 21/577* (2013.01); *G06F 11/3476* (2013.01); *G06F 16/334* (2019.01);
(Continued)

(58) Field of Classification Search
CPC ............. H04L 63/1491; H04L 63/1483; H04L 63/145; H04L 63/1425; H04L 63/1433;
(Continued)

(56) References Cited

U.S. PATENT DOCUMENTS 8,365,286 B2 * 1/2013 Poston .................. G06F 21/563
717/130
8,479,291 B1 7/2013 Bodke
(Continued)

FOREIGN PATENT DOCUMENTS

WO WO-2019075338 A1 * 4/2019 ............. G06N 3/045
WO WO-2021096649 A1 * 5/2021 .......... G06F 21/554
WO 2022188066 A1 9/2022

OTHER PUBLICATIONS

Ainslie S., et al., "Cyber-threat Intelligence for Security Decision-making: A Review and Research Agenda for Practice," Science Direct, Computers & Security, vol. 132, Sep. 2023, pp. 1-16.
(Continued)

*Primary Examiner* — Josnel Jeudy
(74) *Attorney, Agent, or Firm* — Polsinelli P.C.

(57) ABSTRACT

In one aspect, a method includes creating a polymorphic variant of a sample of malware, analyzing the polymorphic variant of the sample of malware by a security management service to determine if the polymorphic variant of the sample of malware evades detection by the security management service, when the security management service fails to detect the polymorphic variant during the analysis of the polymorphic variant, detonating the polymorphic variant in a virtualized environment to identify characterizations of
(Continued)

the polymorphic variant, and training the security management service to detect the polymorphic variant based on the characterizations.

20 Claims, 5 Drawing Sheets

(51) Int. Cl.

| | |
|---|---|
| *G06F 16/334* | (2025.01) |
| *G06F 16/34* | (2019.01) |
| *G06F 16/901* | (2019.01) |
| *G06F 21/31* | (2013.01) |
| *G06F 21/55* | (2013.01) |
| *G06F 21/56* | (2013.01) |
| *G06F 21/57* | (2013.01) |
| *G06N 20/00* | (2019.01) |
| *H04L 9/40* | (2022.01) |

(52) U.S. Cl.
CPC ........ *G06F 16/345* (2019.01); *G06F 16/9024* (2019.01); *G06F 21/31* (2013.01); *G06F 21/552* (2013.01); *G06F 21/563* (2013.01); *G06F 21/566* (2013.01); *G06N 20/00* (2019.01); *H04L 63/1425* (2013.01); *H04L 63/1433* (2013.01); *H04L 63/145* (2013.01); *H04L 63/1483* (2013.01); *H04L 63/1491* (2013.01)

(58) Field of Classification Search
CPC .... G06F 21/577; G06F 21/563; G06F 21/552; G06F 21/31; G06F 11/3476; G06F 16/9024; G06F 16/345; G06F 16/334
USPC .......................................................... 726/25
See application file for complete search history.

(56) References Cited

U.S. PATENT DOCUMENTS

| | | | | |
|---|---|---|---|---|
| 12,019,746 | B1 * | 6/2024 | Smith | G06F 21/564 |
| 12,244,637 | B1 * | 3/2025 | Zhang | H04L 41/16 |
| 2015/0378984 | A1 | 12/2015 | Ateya et al. | |
| 2016/0021174 | A1 * | 1/2016 | De Los Santos Vilchez | H04W 12/128 709/201 |
| 2016/0247087 | A1 | 8/2016 | Nassar et al. | |
| 2017/0075904 | A1 | 3/2017 | Hedges | |
| 2017/0193229 | A1 | 7/2017 | Roychowdhury et al. | |
| 2018/0205755 | A1 | 7/2018 | Kavi et al. | |
| 2018/0329958 | A1 | 11/2018 | Choudhury et al. | |
| 2019/0303498 | A1 | 10/2019 | Saha et al. | |
| 2020/0293656 | A1 | 9/2020 | Lakhotia | |
| 2020/0356675 | A1 | 11/2020 | Shakarian et al. | |
| 2021/0144154 | A1 | 5/2021 | Levy | |
| 2021/0294829 | A1 | 9/2021 | Bender et al. | |
| 2021/0312058 | A1 | 10/2021 | Chiarelli et al. | |
| 2021/0342380 | A1 | 11/2021 | Luus et al. | |
| 2022/0004630 | A1 | 1/2022 | Almukaynizi et al. | |
| 2022/0121964 | A1 | 4/2022 | Ramakrishnan et al. | |
| 2022/0138241 | A1 | 5/2022 | Chen et al. | |
| 2022/0156380 | A1 | 5/2022 | Pradzynski et al. | |
| 2022/0207152 | A1 | 6/2022 | Bellis et al. | |
| 2023/0004559 | A1 | 1/2023 | Kreutzer et al. | |
| 2023/0019941 | A1 | 1/2023 | Doyle et al. | |
| 2023/0036159 | A1 | 2/2023 | Duppils et al. | |
| 2023/0086327 | A1 | 3/2023 | Song et al. | |
| 2026/0023852 | A1 * | 1/2026 | McMillan, Jr. | G06F 21/566 |

OTHER PUBLICATIONS

Alrzini J., et al., "A Review of Polymorphic Malware Detection Techniques", International Journal of Advanced Research in Engineering and Technology (IJARET), vol. 11, No. 12, Dec. 2020, pp. 1238-1247.

Rao D., "How to Use Large Language Models and Knowledge Graphs to Manage Enterprise Data", Venturebeat, Apr. 15, 2023, pp. 1-17.

* cited by examiner

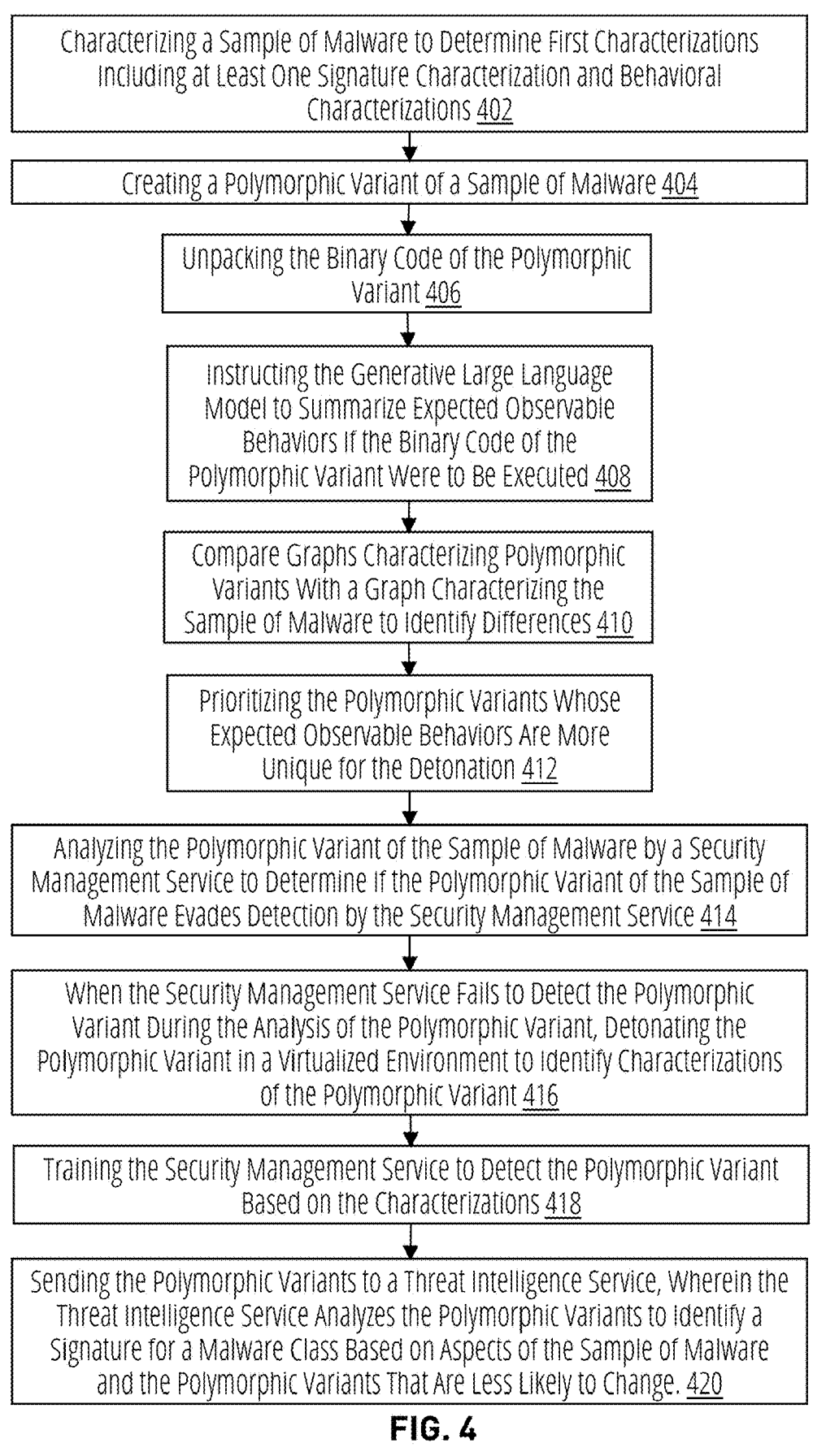

Characterizing a Sample of Malware to Determine First Characterizations Including at Least One Signature Characterization and Behavioral Characterizations 402

Creating a Polymorphic Variant of a Sample of Malware 404

Unpacking the Binary Code of the Polymorphic Variant 406

Instructing the Generative Large Language Model to Summarize Expected Observable Behaviors If the Binary Code of the Polymorphic Variant Were to Be Executed 408

Compare Graphs Characterizing Polymorphic Variants With a Graph Characterizing the Sample of Malware to Identify Differences 410

Prioritizing the Polymorphic Variants Whose Expected Observable Behaviors Are More Unique for the Detonation 412

Analyzing the Polymorphic Variant of the Sample of Malware by a Security Management Service to Determine If the Polymorphic Variant of the Sample of Malware Evades Detection by the Security Management Service 414

When the Security Management Service Fails to Detect the Polymorphic Variant During the Analysis of the Polymorphic Variant, Detonating the Polymorphic Variant in a Virtualized Environment to Identify Characterizations of the Polymorphic Variant 416

Training the Security Management Service to Detect the Polymorphic Variant Based on the Characterizations 418

Sending the Polymorphic Variants to a Threat Intelligence Service, Wherein the Threat Intelligence Service Analyzes the Polymorphic Variants to Identify a Signature for a Malware Class Based on Aspects of the Sample of Malware and the Polymorphic Variants That Are Less Likely to Change. 420

FIG. 4

LLM TECHNOLOGY FOR POLYMORPHIC GENERATION OF SAMPLES OF MALWARE FOR MODELING, GROUPING, DETONATION AND ANALYSIS

CROSS-REFERENCE TO RELATED APPLICATIONS

This application claims the benefit of U.S. Provisional Patent Application Ser. No. 63/493,552, entitled Large Language Models Applied to Security Use Cases, filed Mar. 31, 2023, the disclosure of which is expressly incorporated by reference herein in its entirety.

BACKGROUND

Computing systems and networks may employ malware detection and prevention techniques for ensuring the security and reliability of digital systems. Traditional malware detection methods that rely on signature-based scanning can prove to be less effective against rapidly evolving threats because they may not detect newly released malware. Oftentimes, in order to prevent the effectiveness of possible malware threat manual scanning is often employed which can be time-consuming and costly.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example process of generating polymorphic variants and/or similar variants of collected samples of malware according to some aspects of the present technology.

DETAILED DESCRIPTION

Figure 1:
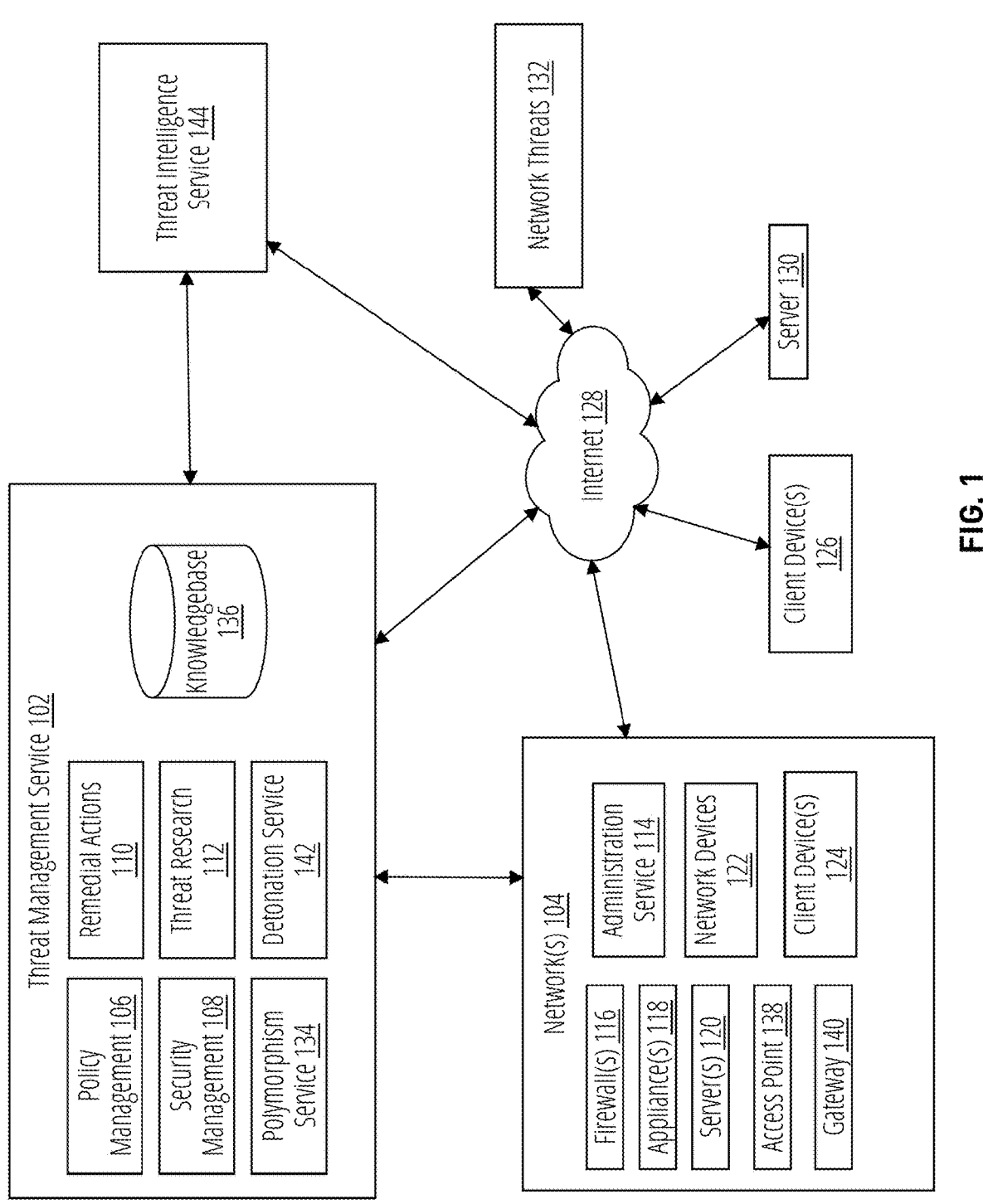
FIG. 1 illustrates an example threat management system in accordance with some aspects of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example, and such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Generative large language models (LLM) are important tools for preventing malware infections and performing threat management. These models can be used to detect malicious activity on a network by analyzing large volumes of data. By leveraging the power of machine learning, these models can identify anomalies or suspicious patterns that may indicate the presence of malware. In addition, they can also be used to detect known malicious code in files or network traffic. By using large language models, better visibility can be gained into wireless network systems to quickly detect and remove any threats in a preventative manner prior to subsequent damage to the network, network devices, and to assist with maintaining the security of the network by protecting sensitive data from falling into the wrong hands.

The present disclosure is directed towards using a large language model for polymorphic generation of samples of malware. Detecting and preventing malware infections in a network is increasingly important for ensuring the security and reliability of digital systems. Traditional malware detection methods that rely on signature-based scanning are less effective against rapidly evolving threats because they may not detect newly released malware. To address these challenges, generative large language models (LLM) have provided a major advancement in machine learning (ML) and artificial intelligence (AI) with the aspiration of transforming domains through learned knowledge. Generative large language models, during the performance of threat management services, can take an existing sample of malware, decompose the elements of the sample and automatically generate polymorphic variants and/or similar variants. An evaluation can further take place to evaluate differences in the samples, and detonating outliers in a sandbox to collect outcomes that could not be originally derived by analysis of the changes alone, through the collection of telemetry. The generated outliers can be observed, after detonation, to identify adjustments needed to threat management service 102.

In one aspect, a method includes creating a polymorphic variant and/or similar variant of a sample of malware, analyzing the polymorphic variant of the sample of malware by a security management service to determine if the polymorphic variant and/or similar variant of the sample of malware evades detection by the security management service. When the security management service fails to detect the polymorphic variant and/or similar variant during the analysis of the polymorphic variant and/or similar variant, the method can detonate the polymorphic variant and/or similar variant in a virtualized environment to identify characterizations of the polymorphic variant and/or similar variant, and train the security management service to detect the polymorphic variant and/or similar variant based on the characterizations.

In another aspect, the method may also include instructing a generative large language model to create one or more polymorphic variants and/or similar variants of the sample of malware.

In another aspect, the sample of malware has been previously characterized and is associated with first characterizations of the sample of malware. The first characterizations can include at least one signature characterization and behavioral characterizations, wherein the at least one signature characterization includes a hash of portions of code making up the sample of malware. The behavioral characterizations can include a graph characterizing a sequence of execution of one or more processes of the sample of malware and behaviors caused by the execution of the one or more processes.

In another aspect, the method may also include a generative large language model that is configured to create the one or more polymorphic variants and/or similar variants of the sample of malware. Creating the one or more polymorphic variants and/or similar variants comprises instructing the generative large language model to generate the polymorphic variants and/or similar variants that perform similar behaviors to the sample of malware using modified code.

In another aspect, the method may also include instructing the generative large language model to create the one or more polymorphic variants and/or similar variants of the sample of malware. Creating the one or more polymorphic variants and/or similar variants further comprises instructing the generative large language model to rewrite one of the one or more processes of the sample of malware to do the same function in a different way.

In another aspect, the method may also include instructing the generative large language model to create the one or more polymorphic variants and/or similar variants of the sample of malware and instructing the generative large language model to generate the polymorphic variants and/or similar variants that execute the one or more processes of the sample of malware in a different sequence.

In another aspect, the method further includes analyzing the sample of malware using a semantic analysis model that understands semantics of malware code to classify portions of the sample of malware as functional or non-functional. The method further includes instructing the generative large language model to generate polymorphic variants and/or similar variants of the sample of malware by rewriting at least some of the functional portions of the sample of malware to perform the same function with alternative code.

In another aspect, the method may also include cross-referencing classifications of the malware code as functional or non-functional and a semantic reasoning engine utilizing a domain-specific knowledge-based ontology to increase confidence in the classifications provided by the semantic analysis model. In some examples, the semantic reasoning engine can search for homomorphic seeds. The search for homomorphic seeds can be used to generate polymorphic variants and/or similar variants.

In another aspect, the method may also include where the sample of malware includes a plurality of wild-type variants of the malware that have been previously characterized and associated with first characterizations. Wild-type variants can be previously characterized malware variants that have been detected in commercial environments. The method further includes instructing the generative large language model to describe the variations between the plurality of the wild-type variants of the malware. The method further includes instructing the generative large language model to create the polymorphic variants and/or similar variants of the sample of malware that are consistent with the type of variations observed in the plurality of the wild-type variants of the malware.

In another aspect, the method may also include determining if the polymorphic variant and/or similar variant of the sample of malware evades detection by the security management service, unpacking the binary code of the polymorphic variant and/or similar variant, and instructing the generative large language model to summarize expected observable behaviors if the binary code of the polymorphic variant and/or similar variant were to be executed. The method may also prioritize the polymorphic variants and/or similar variants whose expected observable behaviors are more unique for the detonation. In some examples, multiple instances of the summary of the observable behaviors can be generated. In some instances, the generative large language model can be the same LLM. In subsequent instances, the generative large language model can be adjusted based on the polymorphic variant and/or similar variant and the prioritization.

In another aspect, the method may also include sending the polymorphic variants and/or similar variants to a threat intelligence service, where the threat intelligence service analyzes the polymorphic variants and/or similar variants to identify a signature for a malware class based on aspects of the sample of malware and the polymorphic variants and/or similar variants that are less likely to change.

In another aspect, the method may also further include instructing the generative large language model to create a graph characterizing a sequence of execution of one or more processes of the polymorphic variant and/or similar variant and behaviors caused by the execution of the one or more processes, compare graphs characterizing polymorphic variants and/or similar variants with a graph characterizing the sample of malware to identify differences, and prioritizing the polymorphic variants and/or similar variants whose graphs are more distinct compared to the graph characterizing the sample of malware for the detonating.

In one aspect, a network device includes one or more memories having computer-readable instructions stored therein, and one or more processors. The one or more processors are configured to execute the computer-readable instructions to create a polymorphic variant and/or similar variant of a sample of malware, analyzing the polymorphic variant and/or similar variant of the sample of malware by a security management service to determine if the polymorphic variant and/or similar variant of the sample of malware evades detection by the security management service. When the security management service fails to detect the polymorphic variant and/or similar variant during the analysis of the polymorphic variant and/or similar variant, the polymorphic variant and/or similar variant is detonated in a virtualized environment to identify characterizations of the polymorphic variant and/or similar variant, and training the security management service to detect the polymorphic variant and/or similar variant based on the characterizations.

In one aspect, one or more non-transitory computer-readable media include computer-readable instructions, which when executed by one or more processors of a network appliance, cause the network appliance to create a polymorphic variant and/or similar variant of a sample of malware, analyzing the polymorphic variant and/or similar variant of the sample of malware by a security management service to determine if the polymorphic variant and/or similar variant of the sample of malware evades detection by the security management service, when the security management service fails to detect the polymorphic variant and/or similar variant during the analysis of the polymorphic variant and/or similar variant, detonating the polymorphic variant and/or similar variant in a virtualized environment to identify characterizations of the polymorphic variant and/or similar variant, and training the security management service to detect the polymorphic variant and/or similar variant based on the characterizations.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Oftentimes, operators monitor and continually retain data related to the known malware within large libraries of malware. Within these large libraries data is retained related to ways to detect, the malware, and resolve and prevent potential attacks. In some instances, the same malware is often utilized by attacking parties through the creation of small variations of the known malware directed towards skirting the detection systems in communication with a network and operators.

In some instances, LLMs can be used by attackers to output variants of malware that are significant enough to thwart detection and the remedial actions.

To address these challenges, the disclosed technology uses machine learning algorithms, such as a generative large language model, to generate polymorphic variants and/or similar variants of malware and uses these variants to improve malware detection by a threat management service. To further address the challenges, the generative large language model can seek sufficiently dissimilar variants via a code space similarity metric to assist with further improving malware detection.

The disclosed technology can analyze a sample of malware, decompose the elements of the samples and automatically generate polymorphic variations of the samples of malware. The existing samples of malware can then be broken down into component parts including functional and non-functional aspects, and automatically generates polymorphic variations. Polymorphic variations are changes made to malicious code intended to infiltrate the security measures of a network in order to evade detection. Oftentimes, this is accomplished by changing the code's appearance and behavior, while still maintaining its functionality. For example, a polymorphic virus may have its signature altered slightly, or it may be encrypted in an attempt to bypass antivirus programs. Polymorphic malware can be difficult to detect, as it is constantly changing and adapting. To combat this threat, the proposed technology includes techniques and processes for polymorphic variation detection that can identify malicious variants even if they do not match known signatures or patterns. Thus resulting in an additional layer of protection against malware threats in wireless networks.

To ensure the process doesn't become overly complex, restrictions can be put in place for the amount of variation that can be introduced to the non-functional elements. The variations created can then be evaluated, with those that contain functional changes potentially being detonated in a sandbox environment to collect outcomes that can't be determined through analysis alone. If the malware engine fails to detect the variation, the associated analysis collected from detonation can then be used to update and improve models generated by the malware engine.

In some examples, we may want to limit the amount of samples sent for detonation while also maximizing the unique sandbox observations. Accordingly, binary samples of malware can be unpacked, and the LLM can be used to generate expected behaviors such as registry modifications, deleted files or network traffic. Samples whose behavioral characterization presents the most unique behaviors can then be prioritized. In scenarios where non-behavioral changes are made, attackers attempt to deceive hash-based detectors by replacing instructions with their equivalent but still maintain identical behavior.

In some examples, a threat management service can use LLM to identify differences between original malware and newly detected malware. This helps avoid the need to predict and test numerous modifications. The differences can then be used to explain/classify what techniques have been employed by the attacker to bypass detection, to identify remediation techniques to thwart the potential malware attack taking place, or future network threats. This also limits the number of possible iterations in predicting further modifications that may be attempted. Additionally, the LLM can map the differences to categories such as the MITRE ATT&CK framework or other classification frameworks, if required.

FIG. 1 illustrates an environment for threat management. Specifically, FIG. 1 depicts a block diagram of a threat management service 102 providing protection to one or more enterprises, networks, locations, users, businesses, etc., against a variety of threats. The threat management service 102 may be used to protect devices (e.g., IoT devices, appliances, services, client devices, or other devices) from computer-generated and human-generated threats.

The threat management service 102 is a malware analysis platform that discovers, identifies, analyzes, and tracks sophisticated threats. It provides an end-to-end workflow from intelligence gathering to multi-vector analysis, threat hunting, and response, resulting in real-time visibility into malicious behavior associated with known and unknown malware.

The threat management service 102 can perform dynamic sandboxing of suspicious files, control flow graph analysis, and memory scanning for detecting malicious activity. The threat management service 102 can accelerate the hunting and finding of threats by providing context for suspicious files, including the behavior of known threats that are tracked across various networks in order to identify associated malware campaigns.

In order to track threats, the threat management service 102 uses a combination of static analysis to examine code and look for telltale indicators that can indicate the presence of malicious code. As well as dynamic analysis to examine how the code behaves when it is executed. This allows the threat management service 102 to accurately identify samples of malware even if they are changed in form but not in function or modified to be difficult for humans or computers to understand (obfuscated).

As explained herein the threat management service 102 further uses detection of both signature characterizations and behavioral characterizations to identify code as malicious or malware. Signature characterization detection works by scanning for known malware, relying on a database of known threats worldwide and their signatures. Behavioral characterization detection looks at how the code behaves when executed, allowing the threat management service 102 to detect unknown or newly created malware.

During detection, the threat management service 102 will look at the code, metadata, download history, and other information associated with the threat to determine whether or not it is malicious. If it is determined that the code is malicious, then the threat management service 102 will create a report that includes detailed information about the threat, such as its origin, type, risk level, and other related characteristics. Additionally, the report may contain indicators that can help identify the malware's spreading patterns and networks used to host the malicious content. The report can further provide any associated user actions or events occurring before the system detected the threat.

The report and analysis in threat management service 102 can further produce a variety of malware resolutions and solutions, such as blocking malicious URLs, killing malicious processes, quarantining affected files and systems, and disabling malicious services. Additionally, it can provide suggestions on how to improve an organization's security posture or alert administrators to new threats that they should be aware of.

An example of threat management service 102 can be CISCO's MALWARE ANALYTICS (THREAT GRID). Cisco Threat Grid can perform a malware analysis that discovers, identifies, analyzes, and tracks sophisticated threats in a wireless network. Cisco Threat Grid can provides an end-to-end workflow from intelligence gathering to multi-vector analysis, threat hunting, and response, resulting in real-time visibility into malicious behavior associated with known and unknown malware. During detection, the platform will look at the code, metadata, download history, and other information associated with the threat to determine whether or not it is malicious. If it is determined that the code is malicious, then Cisco Threat Grid will create a report that includes detailed information about the threat, such as its origin, type, risk level, and other related characteristics.

The threat of malware or other compromises may be present at various points within a network 104 such as client devices 124, server 120, gateways 140, IoT devices, appliances 118, firewalls 116, etc. In addition to controlling or stopping malicious code, the threat management service 102 may provide policy management to control devices, applications, or user accounts that might otherwise undermine the productivity and network performance within the network 104.

The threat management service 102 may provide protection to network 104 from computer-based malware, including viruses, spyware, adware, trojans, intrusion, spam, policy abuse, advanced persistent threats, uncontrolled access, and the like. In general, the network 104 may be any networked computer-based infrastructure or the like managed by the threat management service 102, such as an organization, association, institution, or the like, or a cloud-based service. For example, the network 104 may be a corporate, commercial, educational, governmental, or other network, and may include multiple networks, computing resources, and other facilities, may be distributed among more than one geographical locations, and may include an administration service 114, a firewall 116, an appliance 118, a server 120, network devices 122 including access points 138 and a gateway 140, and endpoint devices such as client devices 124 or IOT devices.

The threat management service 102 may include computers, software, or other computing service supporting a plurality of functions, such as one or more of a security management service 108, a policy management service 106, a remedial action service 110, a threat research service 112, and the like. In some embodiments, the threat protection provided by the threat management service 102 may extend beyond the network boundaries of the network 104 to include client devices 126 that have moved into network connectivity not directly associated with or controlled by the network 104. Threats to client facilities may come from a variety of sources, such as network threats 132, physical proximity threats, and the like. Client device 126 may be protected from threats even when the client device 126 is not directly connected to or in association with the network 104, such as when a client device 126 moves in and out of the network 104, for example, when interfacing with an unprotected server 130 through the internet 128.

The threat management service 102 may use or may be included in an integrated system approach to provide the network 104 with protection from a plurality of threats to device resources in a plurality of locations and network configurations. The threat management service 102 may also or instead be deployed as a stand-alone solution for an enterprise. For example, some or all of the threat management service 102 components may be integrated into a server or servers on premises or at a remote location, for example, in a cloud computing service. For example, some or all of the threat management service 102 components may be integrated into a server 120, firewall 116, gateway 140, appliance 118, or access point 138 within or at the border of the network 104. In some embodiments, the threat management service 102 may be integrated into a product, such as a third-party product (e.g., through an application programming interface), which may be deployed on endpoints, on remote servers, on internal servers or gateways for a network, or some combination of these.

The security management service 108 may include a plurality of elements that provide protection from malware to device resources of the network 104 in a variety of ways, including endpoint security and control, email security and control, web security and control, reputation-based filtering, control of unauthorized users, control of guest and non-compliant computers, and the like. The security management service 108 may also provide protection to one or more device resources of the network 104. The security management service 108 may have the ability to scan client service files for malicious code, remove or quarantine certain applications and files, prevent certain actions, perform remedial actions and perform other security measures. This may include scanning some or all of the files stored on the client service or accessed by the client service on a periodic basis, scanning an application when the application is executed, scanning data (e.g., files or other communication) in transit to or from a device, etc. The scanning of applications and files may be performed to detect known or unknown malicious code or unwanted applications.

The security management service 108 may provide email security and control. The security management service 108 may also or instead provide for web security and control, such as by helping to detect or block viruses, spyware, malware, unwanted applications, and the like, or by helping to control web browsing activity originating from client devices. In some embodiments, the security management service 108 may provide network access control, which may provide control over network connections. In addition, network access control may control access to virtual private networks (VPN) that provide communications networks tunneled through other networks. The security management service 108 may provide host intrusion prevention through behavioral-based analysis of code, which may guard against known or unknown threats by analyzing behavior before or while code executes. Further, or instead, the security management service 108 may provide reputation filtering, which may target or identify sources of code.

In general, the security management service 108 may support overall security of the network 104 using the various techniques described herein, optionally as supplemented by updates of malicious code information and so forth for distribution across the network 104. Information from the security management service 108 may also be sent from the enterprise back to a third party, a vendor, or the like, which may lead to improved performance of the threat management service 102. For example, threat intelligence service 144 can receive information about newly detected threats from sources in addition to the threat management service 102 and can provide intelligence on new and evolving threats.

The policy management service 106 of the threat management service 102 may be configured to take actions, such as to block applications, users, communications, devices, and so on based on determinations made. The policy management service 106 may employ a set of rules or policies that determine network 104 access permissions for one or more of the client devices 124. In some embodiments, a policy database may include a block list, a black list, an allowed list, a white list, or the like, or combinations of the foregoing, that may provide a list of resources internal or external to the network 104 that may or may not be accessed by the client devices 124. The policy management service 106 may also or instead include rule-based filtering of access requests or resource requests, or other suitable techniques for controlling access to resources consistent with a corresponding policy.

As threats are identified and characterized, the threat research service 112 may create updates that may be used to allow the threat management service 102 to detect and remediate malicious software, unwanted applications, configuration and policy changes, and the like. The threat research service 112 may contain threat identification updates, also referred to as definition files and can store these definition files in the knowledgebase 136. A definition file may be a virus identity file that may include definitions of known or potential malicious code. The virus identity definition files may provide information that may identify malicious code within files, applications, or the like. In some embodiments, the definition files can include hash values that can be used to compare potential malicious code against known malicious code. In some embodiments, the definition files can include behavior characterizations, such as graphs of malware behavior. In some embodiments, the threat research service 112 can detonate possible malware to create the behavioral characterizes to be included in the definition files.

The definition files may be accessed by the security management service 108 when scanning files or applications within the client service for the determination of malicious code that may be within the file or application. The definition files include a definition for a neural network or other recognition engine to recognize malware. The threat research service 112 may provide timely updates of definition files information to the knowledgebase 136, network 104, and the like.

In some embodiments, in addition to characterizing detected and known malware in the definition files, the threat research service 112 can utilize a polymorphism service 134 to attempt to improve the ability to recognize polymorphic variants and/or similar variants of detected malware. In some embodiments, the polymorphism service 134 can make use of a generative large language model to create polymorphic variants and/or similar variants of malware and determine if the polymorphic variants and/or similar variants are detected by the security management service 108. When a polymorphic variant and/or similar variant is not detected, the polymorphic variant and/or similar variant can be detonated using detonation service 142. The threat research service 112 can store a hash value and any updates to the behavioral characterizations as part of the definitions files to ensure that the polymorphic variant and/or similar variant of the malware will be detected if it is ever encountered.

The security management service 108 may be used to scan an outgoing file and verify that the outgoing file is permitted to be transmitted per rules and policies of the network 104. By checking outgoing files, the security management service 108 may be able to discover malicious code infected files that were not detected as incoming files. Additionally, the security management service 108 can generate outgoing files for data loss prevention against data loss prevention policies configured by the policy management service 106.

When a threat or policy violation is detected by the threat management service 102, the threat management service 102 may perform or initiate remedial action through the remedial action service 110. Remedial action may take a variety of forms, such as terminating or modifying an ongoing process or interaction, issuing an alert, sending a warning (e.g., to a client device 124 or to the administration service 114) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the client devices 124, quarantining a related application (or files, processes or the like), terminating the application or device, isolating the application or device, moving a process or application code to a sandbox for evaluation by the detonation service 142, isolating one or more of the client devices 124 to a location or status within the network that restricts network access, blocking a network access port from one or more of the client device 124, reporting the application to the administration service 114, or the like, as well as any combination of the foregoing.

In some embodiments, the threat intelligence service 144 offers intelligence on the latest threats and solutions for prevention. For example, the threat intelligence service 144 provides instructional data to all security devices such as threat management service 102 and provides information to create definition files to identify the latest threat to protect the network from newly detected attacks. The main advantage of the threat intelligence service 144 is the large amount of security network devices that can provide threat intelligence service 144 with data on detected and undetected threats. There can be many security devices across many different networks, enterprises, and vendors that can feed information to the threat intelligence service 144, and therefore threat intelligence service 144 has more data on threats than the threat management service 102. The threat intelligence service 144 collects data from many devices and adds to it all the data collected by partners to analyze vectors of new attacks. The threats are tracked using digital signatures that can be used in the definition files used by the threat management service 102.

One type of signature is a Hash-Based signatures. These hashes are generated through dynamic sandboxing, control flow graph analysis, memory scanning, behavior-based detection, and other methods for identifying malicious code. The threat intelligence service 144 can then provide detailed reports with threat indicators that can help administrators track down malicious code and reduce their risk of infection.

Another type of signature is a Pattern Based Signatures or BASS (Automated Signature Synthesizer). BASS (Automated Signature Synthesizer) is a framework designed to automatically generate antivirus signatures from samples belonging to previously generated malware clusters. It is meant to reduce resource usage by producing more pattern-based signatures as opposed to hash-based signatures. Compared to pattern-based or bytecode-based signatures, hash-based signatures have the disadvantage of only matching a single file per signature. Pattern-based signatures are able to identify a whole cluster of files instead of just a single file.

An example of threat intelligence service 144 can be CISCO's TALOS. Cisco Talos (threat intelligence service 144) works with Cisco Threat Grid (threat management service 102) to provide organizations with a comprehensive defense system against malicious threats. Threat Grid provides detection and analysis capabilities, while Talos offers intelligence on the latest threats and solutions for prevention. Cisco Talos provides instructional data to all Cisco security devices and teaches them how to protect the network from newly detected attacks. Cisco Talos can collect data from security network devices on detected and undetected threats to provide other devices with data on emerging threats and attacks and instructions on how to protect the network.

The threat management service 102 may provide threat protection across the network 104 to devices such as the client devices 124, the servers 120, the administration service 114, the firewall 116, the access point 138, the gateway 140, one or more of the network devices 122 (e.g., hubs and routers), one or more of the appliances 118 (e.g., a threat management appliance), any number of desktop or mobile users, and the like in coordination with an endpoint computer security service. The endpoint computer security service may be an application locally loaded onto any device or computer support component on network 104, either for local security functions or for management by the threat management service 102 or other remote resource, or any combination of these.

The network 104 may include one or more of the servers 120, such as application servers, communications servers, file servers, database servers, proxy servers, mail servers, fax servers, game servers, web servers, and the like. In some embodiments, the threat management service 102 may provide threat protection to servers 120 within the network 104 as load conditions and application changes are made.

The client devices 124 may be protected from threats from within the network 104 using a local or personal firewall, which may be a hardware firewall, software firewall, or a combination thereof, that controls network traffic to and from a client. The local firewall may permit or deny communications based on a security policy.

The interface between the threat management service 102 and the network 104 to embedded endpoint computer security facilities, may include a set of tools that may be the same or different for various implementations and may allow network administrators to implement custom controls. In some embodiments, these controls may include both automatic actions and managed actions. The administration service 114 may configure policy rules that determine interactions.

Interactions between the threat management service 102 and the components of the network 104, including mobile client service extensions of the network 104, may ultimately be connected through the internet 128 or any other network or combination of networks. Security-related or policy-related downloads and upgrades to the network 104 may be passed from the threat management service 102 through to components of the network 104 equipped with the endpoint computer security service 108. In turn, the endpoint computer security facilities 108 of the enterprise service 102 may upload policy and access requests back across the internet 128 and through to the threat management service 102. The internet 128, however, is also the path through which threats may be transmitted from their source, and one or more of the endpoint computer security facilities may be configured to protect a device outside the network 104 through locally-deployed protective measures and through suitable interactions with the threat management service 102.

Thus, if the mobile client service were to attempt to connect to an unprotected connection point that is not a part of the network 104, the mobile client service, such as one or more of the client devices 126, may be required to request network interactions through the threat management service 102, where contacting the threat management service 102 may be performed prior to any other network action. In embodiments, the endpoint computer security service of the client device 126 may manage actions in unprotected network environments such as when the client service (e.g., the client device 126) is in a secondary location, where the endpoint computer security service may dictate which applications, actions, resources, users, etc. are allowed, blocked, modified, or the like.

Figure 2:
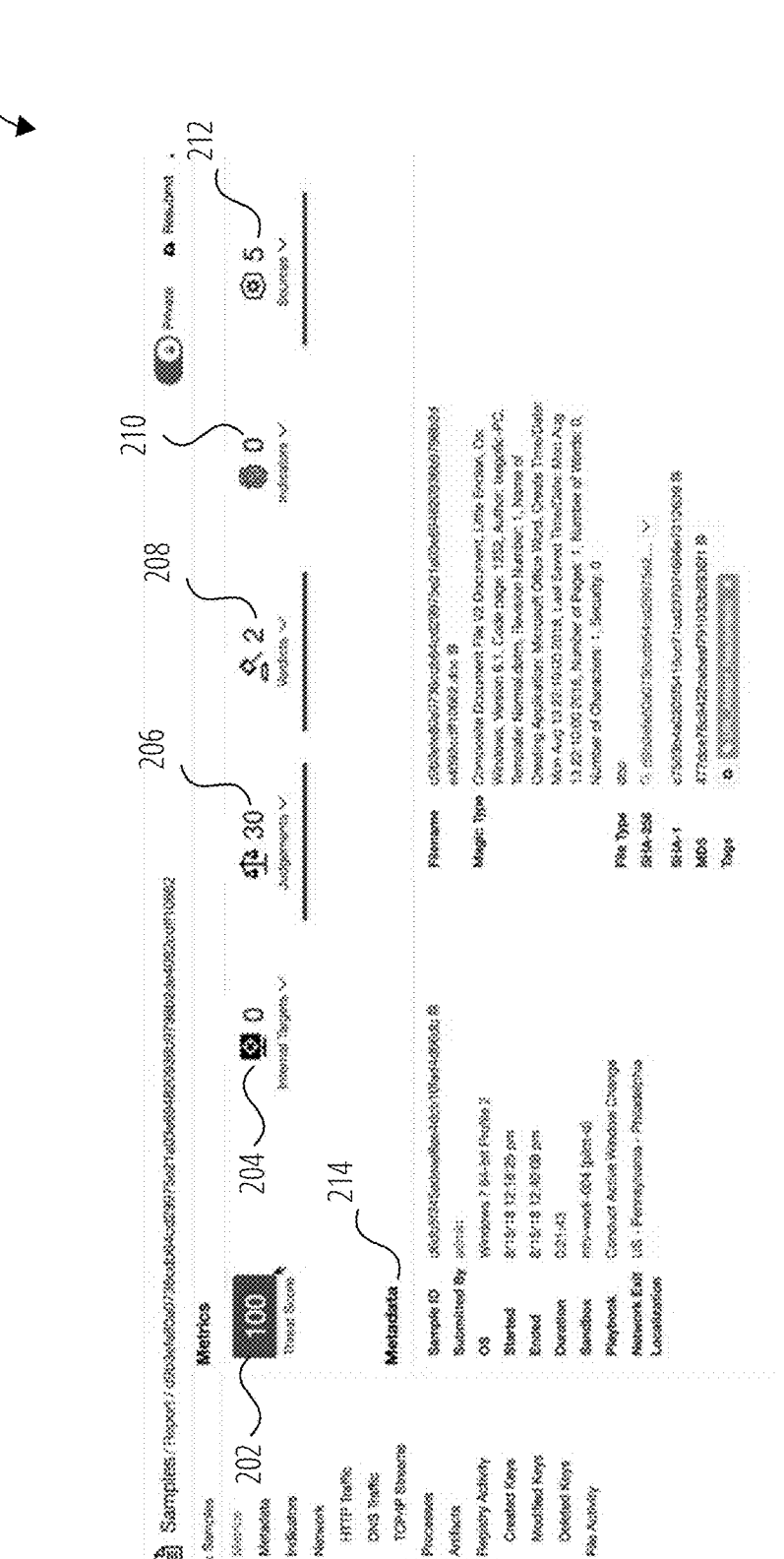
FIG. 2 illustrates an example report generated by the threat management service according to some aspects of the present technology.

FIG. 2 illustrates a malware sample report 200 generated by the threat management service 102 according to some aspects of the present technology. The malware sample report 200 can include a threat score 202, internal targets 204, judgements 206, verdicts 208, indicators 210, sources 212, and metadata 214 related to a sample of malware of malware.

To generate a threat score 202 for a particular sample of malware, the threat management service 102 utilizes a threat scoring system to rate the risk of a particular samples of malware. The threat score 202 is based on factors such as malicious behavior exhibited by the sample, static and dynamic analysis results, connected network indicators, domain reputation, file age, and other characteristics. The score may be affected by how many other detections have been found for the same sample, and how frequently it has been observed in other samples. The threat score is calculated using a combination of factors from the above criteria to give an overall rating of risk for each sample of malware. This score can help determine if the sample is malicious or not, as well as whether it should be blocked or allowed into a network environment. In some examples, this score can be used to prioritize samples that should receive further investigation and further assess whether there is additional data that may be relevant to the risk level of the network threat or malware.

In some examples, network threats identified from samples of malware can have a specified internal target 204 in the network, such as a specific network device, or portion of the network that is intended to be impacted. The threat management service 102 can determine upon detonation of the sample of malware, the intended internal target 204 of the network threat. The threat management service 102 can use a combination of network-level and host-level analysis techniques to identify internal targets of a malicious attack caused by malware.

At the network level, the threat management service 102 can detect potential threats through a plurality of machine learning algorithms. These algorithms allow for an analysis of traffic flows within the network for suspicious behavior such as unusually large amounts of traffic to specific domains, or high volumes of communication between internal and external hosts. In some instances, the threat management service 102 can further use the threat intelligence service to search for relevant indicators of compromise that may be associated with a particular attack.

At the host level, the threat management service 102 can analyze the behavior of samples of malware that have been identified within the network to determine a set of judgements 206 of a risk level of the sample of malware, and how potential internal targets 204 can be affected. Judgments are assigned to each sample of malware based on the threat score generated by the platform. A judgment can be used to express the level of risk posed by a particular sample, such as malicious or benign.

LLM is utilized to create anticipated actions, for example, modifying registries, deleting files, or creating network traffic. This enables the threat management service 102 to differentiate between malicious and non-malicious samples. Furthermore, a mapping can be performed to identify differences between samples of malware stored in the threat management service 102 and various polymorphic variants and/or similar variants.

As the judgments are generated, the threat management service 102 can take an additional step of identifying verdicts 208 of the sample of malware, in order to request remedial action from the remedial action service 110, to address the potential network threat. In some examples, a verdict can be assigned to a sample in order to indicate the nature of its activities, such as ransomware or phishing. Verdicts are derived from various factors, including static analysis results, dynamic analysis behaviors, and connections made between network devices. By assigning judgments and verdicts to samples of malware, organizations can more easily identify which threats they need to prioritize when responding to a malicious attack.

The threat management service 102 can further identify a set of indicators 210 that provide behavioral characterizations to the sample of malware for further analysis, prioritization, or classification of the threat level of the sample of malware. For example, in order to track threats, the threat management service 102 can use a combination of static analysis to examine code and look for known indicators that can indicate the presence of malicious code. Dynamic analysis can also be employed to examine how the code behaves when it is executed. This allows the threat management service 102 to accurately identify samples of malware even if they are changed in form but not in purpose, or obfuscated to be modified to be difficult for humans or computers to understand. Further, the threat management service 102 can use both signature-based and behavior-based detection to identify code as malicious or malware. Signature-based detection works by scanning for known malware, relying on a database of known threats worldwide and their signatures. Behavior-based detection looks at how the code behaves when executed, allowing the threat management service 102 to detect unknown or newly created malware.

During detection, the platform will look at the code, metadata, download history, and other information associated with the network threat to determine whether or not it is malicious. If it is determined that the code is malicious, then the threat management service 102 can create a report of metadata 214 that includes detailed information about the threat, such as its sources 212, type, tags, and risk level. Additionally, the report may contain indicators that can help identify the malware's spreading patterns and networks used to host the malicious content, and any associated user actions or events occurring before the system detected the threat.

Figure 3:
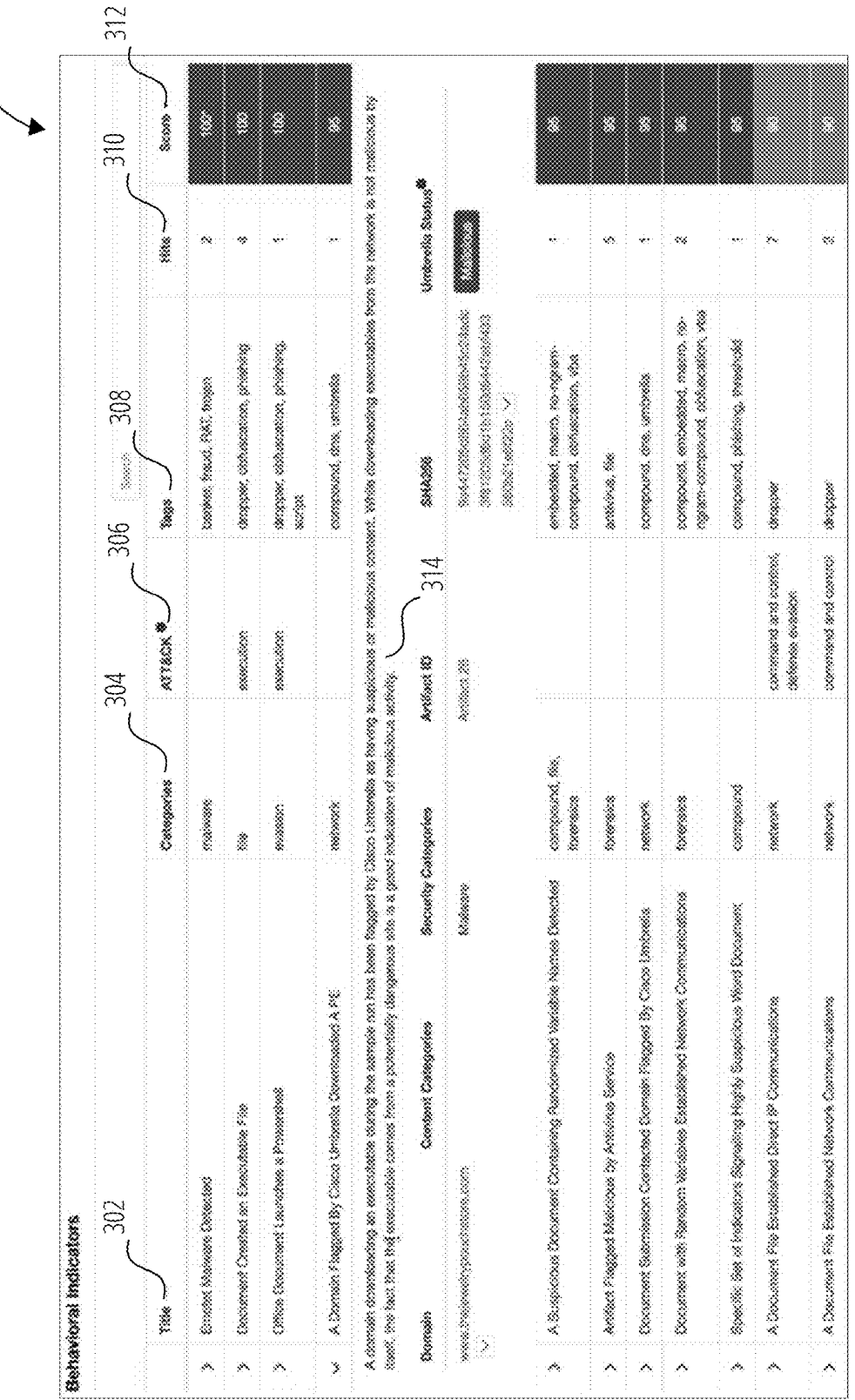
FIG. 3 illustrates an example behavioral characterization report capable of indicating network threats detected in a network according to some aspects of the present disclosure.

FIG. 3 illustrates an example behavioral characterization report 300 capable of indicating network threats 132 detected in a network 104 according to some aspects of the present disclosure. The behavioral characterization report 300 can include a list of titles 302 for the sample of malware, category 304 for the samples of malware, tags 308 associated with the malware, number of hits 310 detected, and an indicator score 312.

The behavioral characterization report 300 is a collection of behavioral characterizations of samples of malware that are identified as possible network threats, including the identification of important behavioral indicators and the assignment of threat scores. Through the behavioral characterization report 300 correlations can be made between samples of malware through the analysis of observed activity, and behavioral characterizations of a sample of malware against a plurality of other samples of malware in a historical and global context as it pertains to the network. The historical and global context of a particular sample of malware can allow for the generation of a semantic analysis model that can provide predictive analysis that can defend against both targeted attacks and more advanced broader threats to the network.

In some examples, the behavioral characterization report 300 can provide a prioritization of titles 302, to allow the threat intelligence service 144 of FIG. 1 to quickly prioritize responses to detected network threats 132 in order to recover from more advanced attacks.

In some examples, the behavioral characterization report 300 can further provide a sequence of the behaviors stored and organized in the report. Thus, there can be an indication of how a particular network threat first affected a network system or network device, actions that took place subsequent to the first effect, and how various network devices in the network system were subsequently affected by the network threat. Additionally, the sequence of events can further indicate any remedial actions that were implemented by the remedial action service 110 of FIG. 1 in order to address the overall impact of the network threat to the network system, as well as preventative measures that were initiated to prevent further impact by similar network threats of the same tags 308, or category 304.

In some examples, the behavioral characterization report 300 can include artifacts that include tags 308, categories 304, an indicator score 312 of each of the titles of the samples of malware in the report, in order to provide identification data that can be input into the generative large language model for training. As the generative large language model is trained by the data from the behavioral characterization report 300 preventative measures related to the samples of malware, and a description 314 of the samples of malware can be determined based on the indicator score 312 associated with the samples of malware. The preventative measures can be associated with a set of guided measures that can be based on the historical context of previous encounters or the detection of particular samples of malware of the same category 304 or tags 308.

In some examples, the threat intelligence service 144 of FIG. 1 can analyze the behavioral characterization report 300 to identify a plurality of polymorphic variants and/or similar variants from the data as it relates to tags 308, categories 304, title 302, indicator score 312, number of hits 310 and description 314 of each of the samples of malware listed in the report. Each of the plurality of polymorphic variants and/or similar variants identified can provide a new set of remedial measures generated by the remedial action service 110, that can provide preventative measures for network threats associated with the samples of malware of the polymorphic variants and/or similar variants, to minimize impact experienced by the network.

FIG. 4 illustrates an example process of generating polymorphic variants and/or similar variants of collected samples of malware according to some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes characterizing a sample of malware to determine first characterizations including at least one signature characterization and behavioral characterizations at block 402. For example, the threat research service 112 illustrated in FIG. 1 may characterize a sample of malware to determine first characterizations including at least one signature characterization and behavioral characterizations. The at least one signature characterization includes a hash of portions of code making up the sample of malware. The behavioral characterizations include a graph characterizing a sequence of execution of one or more processes of the sample of malware and behaviors caused by the execution of the one or more processes.

As discussed above, LLM is utilized to create anticipated actions, for example, modifying registries, deleting files, or creating network traffic. This enables the threat management service 102 in FIG. 1, to differentiate between malicious and non-malicious samples. Polymorphic variants and/or similar variants generated by the LLM can help protect against malware threats by making it more difficult for malicious programs and malware to recognize and target specific code in a network. By creating remedial measures to thwart potential threats, through the updating of code with each generation of polymorphic variants and/or similar variants, malicious program, and malware threats are unable to recognize the underlying code of the network and therefore cannot exploit a vulnerability. Thus, employing this type of security measure can provide additional protection when dealing with high-risk systems or data, as it can help protect against targeted attacks and also prevent malicious programs from gaining access to sensitive information stored on the system by making it difficult to detect and decrypt the data.

According to some examples, the method includes creating a polymorphic variant and/or similar variant of a sample of malware at block 404. For example, the polymorphism service 134 illustrated in FIG. 1 can be used to create a variant of a sample of malware. This process involves instructing a generative large language model to create multiple polymorphic variants and/or similar variants based on the original sample. The generative large language model is configured to generate polymorphic variants and/or similar variants that replicate the behaviors of the sample of malware, but with modified code. This allows organizations to identify potential threats and take action to protect their networks from malicious attacks.

In order to ensure that the polymorphism service 134 isn't overloaded with variants, code can be eliminated that doesn't match a sequence that pertains to a collection of behaviors that could indicate one or more network threats 132. It is important to be careful not to overload a malware tracking system with too many polymorphic variants and/or similar variants as this can increase false positives. In some examples, depending on the creation of the signature of the polymorphic variants and/or similar variants, the signature may be configured to cover multiple variants with similar malicious behavior. In the case of new variants representing new undetectable malicious behavior, additional signatures can be created. This means that the system may flag legitimate files or code as malicious, resulting in unnecessary disruption and wasted resources.

In some examples, the generative large language model can cause the generation of the polymorphic variants and/or similar variants that execute the one or more processes of the sample of malware in a different sequence. In essence, the generative large language model is being instructed to rewrite one of the one or more processes of the sample of malware to do the same function in a different way. The sample of malware can further be analyzed using a semantic analysis model that understands the semantics of malware code to classify portions of the sample of malware as functional or non-functional. Rewriting polymorphic variants and/or similar variants of samples of malware that perform the same function by ensuring that only unique and independent polymorphic variants and/or similar variants are retained within the malware libraries. Thus, increasing the number of unique variants that exist in the system, making it more difficult for malicious programs to become "immune" to certain variants and therefore reducing the vulnerability of the system.

In some examples, the generative large language model can be instructed to generate polymorphic variants and/or similar variants of the sample of malware by rewriting at least some of the functional portions of the sample of malware to perform the same function with alternative code. The classifications of the sample of malware can then be cross referenced as functional or non-functional against a semantic reasoning engine utilizing a domain-specific knowledgebase ontology to increase confidence in the classifications provided by the semantic analysis model. Rewriting polymorphic variants and/or similar variants of samples of malware can help to resolve the issue of an overload of polymorphic variants and/or similar variants in the malware tracking system because, through rewriting, only new and relevant variants need to be generated, thus helping to reduce the number of false positives that are flagged by the system.

In some examples, the sample of malware can include a plurality of wild-type variants of the malware that have been previously characterized and associated with first characterizations. Potential attackers may determine that wild-type variants may be less likely to be detected, or considered in malware thwarting processes due to a low probability of their success or number of hits in previous attacks. Thus, samples of malware that could be considered low priority in a security management service could have a higher likelihood of success. Accordingly, the generative large language model can be instructed to describe the variations between the plurality of the wild-type variants of the malware. The generative large language model can subsequently be instructed to create the polymorphic variants and/or similar variants of the sample of malware that are consistent with the type of variations observed in the plurality of the wild-type variants of the malware. Including polymorphic variants and/or similar variants with identified wild-type variants of the malware can help ensure that the network is more likely to detect different threats more accurately and quickly. Having a range of unique variants that include the wild-type variants, that in some instances could be considered unlikely to affect the system, can increase the complexity for malicious programs to become "immune" to certain variants, making it more difficult for them to exploit vulnerabilities.

According to some examples, the method includes unpacking the binary code of the polymorphic variant and/or similar variant at block 406. Unpacking the binary code of polymorphic variants and/or similar variants can help generate behavioral characteristics used to develop new unique samples to monitor for at the security management service. By unpacking the binary code, polymorphic variants and/or similar variants that may subtly affect a network may become more easier to identify as malware, and the actions performed by the malware can be more readily identified as malicious behavior or activities. Thus, with this additional information, the security management service can create more accurate and targeted responses to threats from various attackers and network threats. For example, the threat research service 112 can unpack the binary code of the polymorphic variant and/or similar variant prior to the sample of malware being analyzed for behavioral characterization.

According to some examples, the method includes instructing the generative large language model to summarize expected observable behaviors if the binary code of the polymorphic variant and/or similar variant were to be executed at block 408. After the binary code has been unpacked as described in block 406, the unpacked binary code can be summarized to create categories of observable behavioral characterizations that could be considered malware. This can include, but is not limited to malicious file modifications, changes to system settings or permissions, unauthorized data access or transmission, changes in registry keys or values, and suspicious network connections. These behavioral characterization categories can then be used as a guide by the security management service to create more targeted and accurate samples of malware, thus reducing the overload while still providing a high level of security against threats. These behavioral characterization categories can also be used as a guideline for developing response strategies to various types of malicious activities or behaviors. For example, the threat research service 112 can analyze binary code to summarize expected observable behaviors if the binary code of the polymorphic variant and/or similar variant were to be executed.

According to some examples, the method includes instructing the generative large language model to create a graph characterizing the polymorphic variants and/or similar variants. By graphing the polymorphic variants and/or similar variants, the threat research service 112 can create a visualization that can provide additional analysis by the security management service, or for operators such as analysts and developers to identify any unique characteristics that may exist between different variants. Additionally, the graph can also help to identify any similarities or patterns that may exist between the variants, which can be used to improve the accuracy of malware detection. For example, the threat research service 112 in FIG. 1, can perform an analysis of the sample of malware, and create a graph providing behavioral characterizations of the sample of malware. The graph can be generated by analyzing the different elements of the sample of malware such as file names and hashes as well as its dynamic behaviors like registry modifications or deleted files. The analysis of these elements can further be cross referenced to associated domains or suspicious IP addresses of known threats in order to generate the graph.

According to some examples, the method includes comparing graphs characterizing polymorphic variants and/or similar variants with a graph characterizing the sample of malware to identify differences at block 410. For example, the threat research service 112 of FIG. 1 can compare the graphs generated, with a graph characterizing the sample of malware to identify differences to determine an overall threat level of the network threat.

According to some examples, the method includes prioritizing the polymorphic variants and/or similar variants whose expected observable behaviors are more unique for the detonation at block 412. For example, the threat research service 112 can prioritize the polymorphic variants and/or similar variants whose expected observable behaviors are more unique for the detonation. Prioritizing the polymorphic variants and/or similar variants based on observable behaviors can help to make a more targeted and independent detonation in a virtual environment sample of malware. By analyzing and categorizing various types of malicious activities or behaviors, it becomes easier to prioritize which samples should be detonated first in order to prevent any damage from occurring. Through the prioritization, the security management service can ensure that an efficient and quick response can be provided when malicious behavioral characterizations have been detected that has a similarity, or direct correlation with previously detected polymorphic variants and/or similar variants.

According to some examples, the method includes prioritizing the polymorphic variants and/or similar variants whose graphs are more distinct compared to the graph characterizing the sample of malware for the detonating. Comparing graphs of different categories of polymorphic variants and/or similar variants can help identify which indexes and categories of polymorphic variants and/or similar variants are most vulnerable to attack and cause the security management service to focus on those areas. Additionally, by looking at specific categories of variants, it becomes easier to identify any similarities between them and thereby prevent the generation of unnecessary variants that can lead to an overload in the system. For example, the polymorphism service 134 can analyze the distinctions in the compared graphs to identify the distinction of the sample of malware. By analyzing the different elements of each graph, such as file names and hashes, and dynamic behaviors, the threat management service 102 can identify any discrepancies between the sample of malware and its polymorphic variants and/or similar variants.

According to some examples, the method includes analyzing the polymorphic variant and/or similar variant of the sample of malware by a security management service to determine if the polymorphic variant and/or similar variant of the sample of malware evades detection by the security management service at block 414. Due to the evolution of various samples of malware, the polymorphic variant and/or similar variant of the sample of malware may be able to evade the security management service. In this instance, the security management service may need to perform an additional analysis of polymorphic variants and/or similar variants identified to identify additional potential threats. For example, the security management service 108 illustrated in FIG. 1 may analyze the polymorphic variant and/or similar variant of the sample of malware by a security management service to determine if the polymorphic variant and/or similar variant of the sample of malware evades detection by the security management service.

According to some examples, when the security management service fails to detect the polymorphic variant and/or similar variant during the analysis of the polymorphic variant and/or similar variant, the method can further include detonating the polymorphic variant and/or similar variant in a virtualized environment to identify characterizations of the polymorphic variant and/or similar variant at block 416. The failure to detect the polymorphic variant and/or similar variant can provide an indication to the security management service that additional analysis is needed in order to prevent the successful attack from occurring again, and to prepare for subsequent polymorphic variants and/or similar variants of the sample of malware to prevent future attacks. For example, the detonation service 142 illustrated in FIG. 1 may detonate the polymorphic variant and/or similar variant in a virtualized environment to identify characterizations of the polymorphic variant and/or similar variant.

According to some examples, the method includes training the security management service to detect the polymorphic variant and/or similar variant based on the characterizations at block 418. The security management service can in some instances fail to detect the polymorphic variant and/or similar variant during analysis, thus, the security management service may need to be retrained. For example, the threat research service 112 illustrated in FIG. 1 may trained the security management service to detect the polymorphic variant and/or similar variant based on the characterizations.

According to some examples, the method includes sending the polymorphic variants and/or similar variants to a threat intelligence service, wherein the threat intelligence service analyzes the polymorphic variants and/or similar variants to identify a signature for a malware class based on aspects of the sample of malware and the polymorphic variants and/or similar variants that are less likely to change at block 420. Identifying a signature of the polymorphic variants and/or similar variants can assist the security management service with creating more distinct classifications and signatures, thus making it easier to detect different threats more accurately and quickly. Polymorphic variants and/or similar variants of samples of malware can have a variety of signatures, including but not limited to hashes, file format and size, code structure and syntax, executable instructions, function calls, registry keys and values, system resources accessed or modified, network connections made and data packets exchanged. By identifying these various signatures for each sample of malware, the system can track the variants more accurately and quickly, thus reducing the likelihood of false positives occurring. For example, the threat research service 112 can be configured to analyze the polymorphic variants and/or similar variants to identify either of these signatures for a malware class based on aspects of the sample of malware and the polymorphic variants and/or similar variants that are less likely to change.

Figure 5:
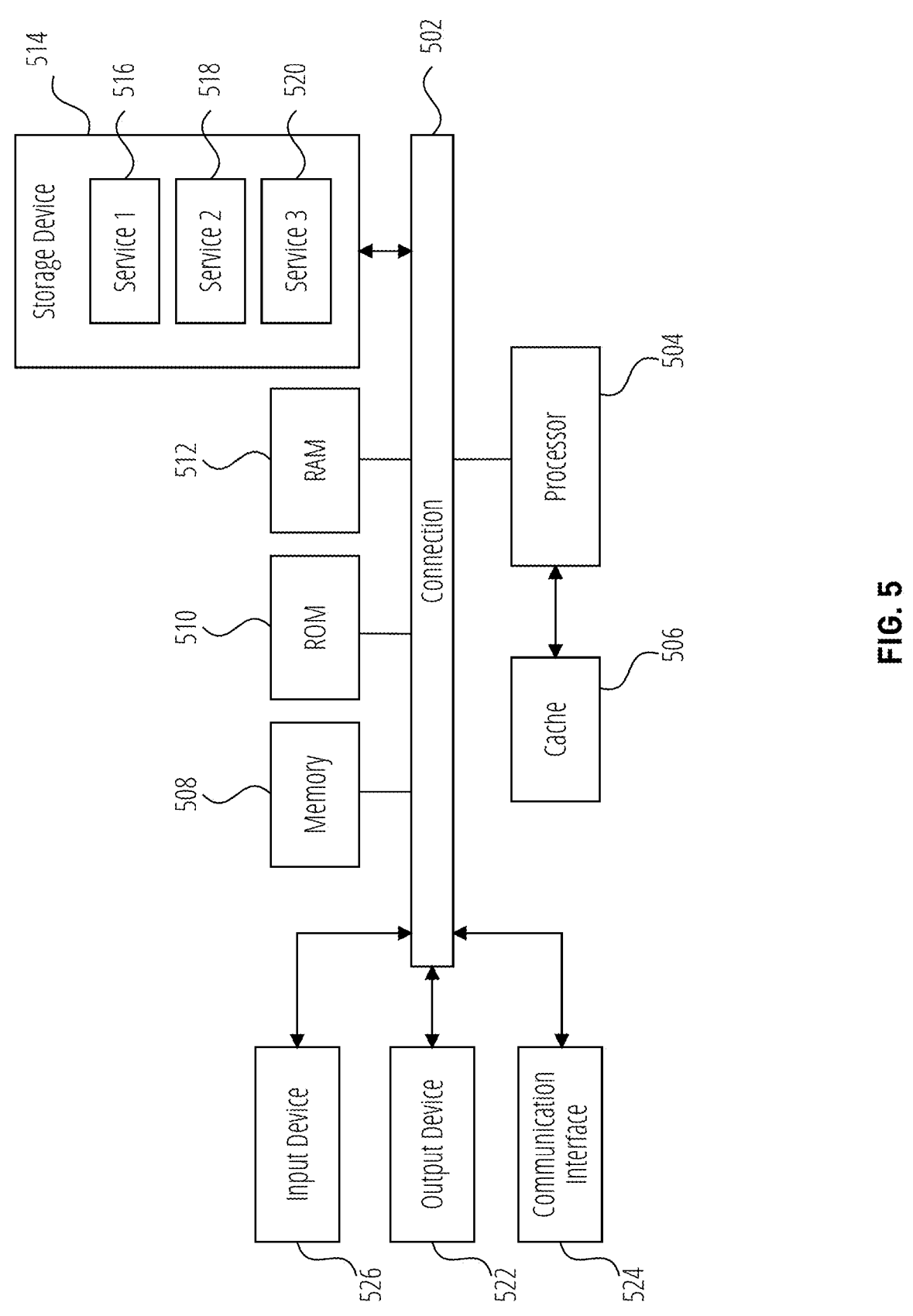
FIG. 5 illustrates an example of a computing system according to some aspects of the present technology.

FIG. 5 shows an example of computing system 500, which can be for example any computing device making up the system network 100 of FIG. 1, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (central processing unit (CPU) or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Some aspects of the present technology include:

Aspect 1. A method comprising: creating a polymorphic variant and/or similar variant of a sample of malware; analyzing the polymorphic variant and/or similar variant of the sample of malware by a security management service to determine if the polymorphic variant and/or similar variant of the sample of malware evades detection by the security management service; when the security management service fails to detect the polymorphic variant and/or similar variant during an analysis of the polymorphic variant and/or similar variant, detonating the polymorphic variant and/or similar variant in a virtualized environment to identify characterizations of the polymorphic variant and/or similar variant;

and training the security management service to detect the polymorphic variant and/or similar variant based on the characterizations.

Aspect 2. The method of Aspect 1, wherein the creating the polymorphic variant and/or similar variant comprises instructing a generative large language model to create one or more polymorphic variants and/or similar variants of the sample of the malware.

Aspect 3. The method of any of Aspects 1 to 2, wherein the instructing the generative large language model to create the one or more polymorphic variants and/or similar variants of the sample of the malware further comprises: instructing the generative large language model to generate the polymorphic variants and/or similar variants that perform similar behaviors to the sample of the malware using modified code.

Aspect 4. The method of any of Aspects 1 to 3, wherein the instructing the generative large language model to create the one or more polymorphic variants and/or similar variants of the sample of malware further comprises: instructing the generative large language model to generate the polymorphic variants and/or similar variants that execute one or more processes of the sample of the malware in a different sequence.

Aspect 5. The method of any of Aspects 1 to 4, wherein the instructing the generative large language model to create the one or more polymorphic variants and/or similar variants of the sample of malware further comprises: instructing the generative large language model to rewrite one of one or more processes of the sample of the malware to do a same function in a different way.

Aspect 6. The method of any of Aspects 1 to 5, further comprising: analyzing the sample of the malware using a semantic analysis model that understands semantics of malware code to classify portions of the sample of the malware as functional or non-functional; and instructing the generative large language model to generate polymorphic variants and/or similar variants of the sample of the malware by rewriting at least some of the functional portions of the sample of the malware to perform a same function with alternative code.

Aspect 7. The method of any of Aspects 1 to 6, further comprising: cross-referencing classifications of the malware code as functional or non-functional again a semantic reasoning engine utilizing a domain-specific knowledge-based ontology to increase confidence in the classifications provided by the semantic analysis model.

Aspect 8. The method of any of Aspects 1 to 7, wherein the sample of malware includes a plurality of wild-type variants of the malware that have been previously characterized and associated with first characterizations, the method further comprising: instruct the generative large language model to describe variations between the plurality of the wild-type variants of the malware; and instruct the generative large language model to create the polymorphic variants and/or similar variants of the sample of the malware that are consistent with a type of the variations observed in the plurality of the wild-type variants of the malware.

Aspect 9. The method of any of Aspects 1 to 8, further comprising: wherein prior to the analyzing the polymorphic variant of the sample of malware by the security management service to determine if the polymorphic variant and/or similar variant of the sample of the malware evades detection by the security management service, unpacking binary code of the polymorphic variant and/or similar variant; and instructing the generative large language model to summarize expected observable behaviors if the binary code of the polymorphic variant and/or similar variant were to be executed; and prioritizing the polymorphic variants and/or similar variants whose expected observable behaviors are more unique for the detonation.

Aspect 10. The method of any of Aspects 1 to 9, further comprising: instructing the generative large language model to create a graph characterizing a sequence of execution of one or more processes of the polymorphic variant and/or similar variant and behaviors caused by the execution of the one or more processes; compare graphs characterizing polymorphic variants and/or similar variants with the graph characterizing the sample of the malware to identify differences; prioritizing the polymorphic variants and/or similar variants whose graphs are more distinct compared to the graph characterizing the sample of the malware for the detonating.

Aspect 11. The method of any of Aspects 1 to 10, wherein the sample of malware has been previously characterized and is associated with first characterizations of the sample of the malware, the first characterizations including at least one signature characterization and behavioral characterizations, wherein the at least one signature characterization includes a hash of portions of code making up the sample of the malware, wherein the behavioral characterizations include a graph characterizing a sequence of execution of one or more processes of the sample of the malware and behaviors caused by the execution of the one or more processes.

Aspect 12. The method of any of Aspects 1 to 11, further comprising: sending the polymorphic variants and/or similar variants to a threat intelligence service, wherein the threat intelligence service analyzes the polymorphic variants and/or similar variants to identify a signature for a malware class based on aspects of the sample of malware and the polymorphic variants and/or similar variants that are less likely to change.

Aspect 13. A network device comprising: one or more memories having computer-readable instructions stored therein; and one or more processors configured to execute the computer-readable instructions to: create a polymorphic variant and/or similar variant of a sample of malware; analyze the polymorphic variant and/or similar variant of the sample of the malware by a security management service to determine if the polymorphic variant and/or similar variant of the sample of the malware evades detection by the security management service; when the security management service fails to detect the polymorphic variant and/or similar variant during an analysis of the polymorphic variant and/or similar variant, detonate the polymorphic variant and/or similar variant in a virtualized environment to identify characterizations of the polymorphic variant and/or similar variant; and train the security management service to detect the polymorphic variant and/or similar variant based on the characterizations.

Aspect 14. The network device of Aspect 13, wherein the sample of the malware has been previously characterized and is associated with first characterizations of the sample of the malware, the first characterizations including at least one signature characterization and behavioral characterizations, wherein the at least one signature characterization includes a hash of portions of code making up the sample of the malware, wherein the behavioral characterizations include a graph characterizing a sequence of execution of one or more processes of the sample of the malware and behaviors caused by the execution of the one or more processes.

Aspect 15. The network device of any of Aspects 13 to 14, wherein the creating the polymorphic variant and/or similar variant comprises instructing a generative large language model to create one or more polymorphic variants and/or similar variants of the sample of the malware.

Aspect 16. The network device of any of Aspects 13 to 15, wherein the instructing the generative large language model to create the one or more polymorphic variants and/or similar variants of the sample of the malware further comprises: instructing the generative large language model to generate the polymorphic variants and/or similar variants that perform similar behaviors to the sample of the malware using modified code.

Aspect 17. The network device of any of Aspects 13 to 16, wherein the instructing the generative large language model to create the one or more polymorphic variants and/or similar variants of the sample of the malware further comprises: instructing the generative large language model to generate the polymorphic variants and/or similar variants that execute one or more processes of the sample of the malware in a different sequence.

Aspect 18. The network device of any of Aspects 13 to 17, wherein the instructing the generative large language model to create the one or more polymorphic variants and/or similar variants of the sample of the malware further comprises: instructing the generative large language model to rewrite one or one or more processes of the sample of the malware to do a same function in a different way.

Aspect 19. The network device of any of Aspects 13 to 18, wherein the one or more processors are further configured to: analyze the sample of the malware using a semantic analysis model that understands semantics of malware code to classify portions of the sample of the malware as functional or non-functional; and instruct the generative large language model to generate polymorphic variants and/or similar variants of the sample of the malware by rewriting at least some of the functional portions of the sample of the malware to perform a same function with alternative code.

Aspect 20. A non-transitory computer-readable storage medium comprising computer-readable instructions, which when executed by one or more processors of a network appliance, cause the network appliance to: create a polymorphic variant and/or similar variant of a sample of malware; analyze the polymorphic variant and/or similar variant of the sample of the malware by a security management service to determine if the polymorphic variant and/or similar variant of the sample of the malware evades detection by the security management service; when the security management service fails to detect the polymorphic variant and/or similar variant during an analysis of the polymorphic variant and/or similar variant, detonate the polymorphic variant and/or similar variant in a virtualized environment to identify characterizations of the polymorphic variant and/or similar variant; and train the security management service to detect the polymorphic variant and/or similar variant based on the characterizations.

Aspect 21. The non-transitory computer-readable storage medium of Aspect 20, wherein the sample of the malware has been previously characterized and is associated with first characterizations of the sample of the malware, the first characterizations including at least one signature characterization and behavioral characterizations, wherein the at least one signature characterization includes a hash of portions of code making up the sample of the malware, wherein the behavioral characterizations include a graph characterizing a sequence of execution of one or more processes of the sample of the malware and behaviors caused by the execution of the one or more processes.

Aspect 22. The non-transitory computer-readable storage medium of any of Aspects 20 to 21, wherein the creating the polymorphic variant and/or similar variant comprises instructing a generative large language model to create one or more polymorphic variants and/or similar variants of the sample of the malware.

Aspect 23. The non-transitory computer-readable storage medium of any of Aspects 20 to 22, wherein the instructing the generative large language model to create the one or more polymorphic variants and/or similar variants of the sample of the malware further comprises: instructing the generative large language model to generate the polymorphic variants and/or similar variants that perform similar behaviors to the sample of the malware using modified code.

Aspect 24. The non-transitory computer-readable storage medium of any of Aspects 20 to 23, wherein the instructing the generative large language model to create the one or more polymorphic variants and/or similar variants of the sample of the malware further comprises: instructing the generative large language model to generate the polymorphic variants and/or similar variants that execute one or more processes of the sample of the malware in a different sequence.

Aspect 25. The non-transitory computer-readable storage medium of any of Aspects 20 to 24, wherein the instructing the generative large language model to create the one or more polymorphic variants and/or similar variants of the sample of the malware further comprises: instructing the generative large language model to rewrite one of one or more processes of the sample of the malware to do the same function in a different way.

Aspect 26. The non-transitory computer-readable storage medium of any of Aspects 20 to 25, wherein the one or more processors are further configured to: analyze the sample of the malware using a semantic analysis model that understands semantics of malware code to classify portions of the sample of the malware as functional or non-functional; and instruct the generative large language model to generate polymorphic variants and/or similar variants of the sample of the malware by rewriting at least some of the functional portions of the sample of the malware to perform a same function with alternative code.

What is claimed is:

1. A method comprising:
creating polymorphic variants of a sample of malware;
unpacking binary code of the polymorphic variants;
instructing a generative large language model to summarize and categorize expected observable behaviors of execution of the unpacked binary code of the polymorphic variants, wherein the summary includes behavioral indicators grouped into categories;
prioritizing one or more of the polymorphic variants based on uniqueness of the categorized expected observable behaviors;
analyzing the one or more polymorphic variants by a security management service to determine whether the one or more polymorphic variants of the sample of the malware evades detection by the security management service;
when the security management service fails to detect the one or more polymorphic variants during the analyzing of the one or more polymorphic variants, detonating the one or more polymorphic variants in a virtualized environment to identify characterizations of the one or more polymorphic variants; and
training the security management service to detect the one or more polymorphic variants based on the characterizations.

2. The method of claim 1, wherein the sample of the malware has been previously characterized and is associated with first characterizations of the sample of the malware, the first characterizations including at least one signature characterization and behavioral characterizations, wherein the at least one signature characterization includes a hash of portions of code making up the sample of the malware, wherein the behavioral characterizations include a graph characterizing a sequence of execution of one or more processes of the sample of the malware and behaviors caused by the execution of the one or more processes.

3. The method of claim 1, wherein creating the polymorphic variants of the sample of the malware further comprises instructing the generative large language model to:
generate the polymorphic variants that executes one or more processes of the sample of the malware in a different sequence; and
rewrite one of the one or more processes of the sample of the malware to do a same function in a different way.

4. The method of claim 3, further comprising:
analyzing the sample of the malware using a semantic analysis model that understands semantics of malware code to classify portions of the sample of the malware as functional or non-functional; and
instructing the generative large language model to generate polymorphic variants of the sample of the malware by rewriting at least some of the functional portions of the sample of the malware to perform the same function with alternative code.

5. The method of claim 4, further comprising:
cross-referencing classifications of the malware code as functional or non-functional again a semantic reasoning engine utilizing a domain-specific knowledge-based ontology to increase confidence in the classifications provided by the semantic analysis model.

6. The method of claim 3, wherein the sample of the malware includes a plurality of wild-type variants of the malware that have been previously characterized and associated with first characterizations, the method further comprising:
instruct the generative large language model to describe variations between the plurality of the wild-type variants of the malware; and
instruct the generative large language model to create the polymorphic variants of the sample of the malware that are consistent with a type of variations observed in the plurality of the wild-type variants of the malware.

7. The method of claim 1, further comprising:
sending the one or more polymorphic variants to a threat intelligence service, wherein the threat intelligence service analyzes the one or more polymorphic variants to identify a signature for a malware class based on aspects of the sample of the malware and the one or more polymorphic variants that are less likely to change.

8. A network device comprising:
one or more memories having computer-readable instructions stored therein; and
one or more processors configured to execute the computer-readable instructions to:
create polymorphic variants of a sample of malware;
unpacking binary code of the polymorphic variants;
instructing a generative large language model to summarize and categorize expected observable behaviors of execution of the unpacked binary code of the polymorphic variants, wherein the summary includes behavioral indicators grouped into categories;

prioritizing one or more of the polymorphic variants based on uniqueness of the categorized expected observable behaviors;

analyze the one or more polymorphic variants of the sample of the malware by a security management service to determine whether the one or more polymorphic variants of the sample of the malware evades detection by the security management service;

when the security management service fails to detect the one or more polymorphic variants during the analyzing of the one or more polymorphic variant, detonate the one or more polymorphic variants in a virtualized environment to identify characterizations of the one or more polymorphic variants; and train the security management service to detect the one or more polymorphic variants based on the characterizations.

9. The network device of claim 8, wherein the sample of the malware has been previously characterized and is associated with first characterizations of the sample of the malware, the first characterizations including at least one signature characterization and behavioral characterizations, wherein the at least one signature characterization includes a hash of portions of code making up the sample of the malware, wherein the behavioral characterizations include a graph characterizing a sequence of execution of one or more processes of the sample of the malware and behaviors caused by the execution of the one or more processes.

10. The network device of claim 8, wherein creating the one or more polymorphic variants of the sample of the malware further comprises:

instructing the generative large language model to generate the polymorphic variants that perform similar behaviors to the sample of the malware using modified code.

11. The network device of claim 10, wherein creating the polymorphic variants of the sample of the malware further comprises instructing the generative large language model to:

generate the polymorphic variants that execute one or more processes of the sample of the malware in a different sequence; and rewrite one of the one or more processes of the sample of the malware to do a same function in a different way.

12. The network device of claim 11, wherein the one or more processors are further configured to:

analyze the sample of the malware using a semantic analysis model that understands semantics of malware code to classify portions of the sample of the malware as functional or non-functional; and instruct the generative large language model to generate polymorphic variants of the sample of the malware by rewriting at least some of the functional portions of the sample of the malware to perform the same function with alternative code.

13. A non-transitory computer-readable storage medium comprising computer-readable instructions, which when executed by one or more processors of a network appliance, cause the network appliance to:

create polymorphic variants of a sample of malware;

unpacking binary code of the polymorphic variants;

instructing a generative large language model to summarize and categorize expected observable behaviors of execution of the unpacked binary code of the polymorphic variants, wherein the summary includes behavioral indicators grouped into categories;

prioritizing one or more of the polymorphic variants based on uniqueness of the categorized expected observable behaviors;

analyze the one or more polymorphic variants of the sample of the malware by a security management service to determine whether the one or more polymorphic variants of the sample of the malware evades detection by the security management service;

when the security management service fails to detect the one or more polymorphic variants during the analyzing of the one or more polymorphic variants, detonate the one or more polymorphic variants in a virtualized environment to identify characterizations of the one or more polymorphic variants; and train the security management service to detect the one or more polymorphic variants based on the characterizations.

14. The non-transitory computer-readable storage medium of claim 13, wherein the sample of the malware has been previously characterized and is associated with first characterizations of the sample of the malware, the first characterizations including at least one signature characterization and behavioral characterizations, wherein the at least one signature characterization includes a hash of portions of code making up the sample of the malware, wherein the behavioral characterizations include a graph characterizing a sequence of execution of one or more processes of the sample of the malware and behaviors caused by the execution of the one or more processes.

15. The non-transitory computer-readable storage medium of claim 13, wherein the creating the polymorphic variants comprises instructing the generative large language model to create the polymorphic variants of the sample of the malware.

16. The non-transitory computer-readable storage medium of claim 15, wherein the instructing the generative large language model to create the polymorphic variants of the sample of the malware further comprises:

instructing the generative large language model to generate the polymorphic variants that perform similar behaviors to the sample of the malware using modified code.

17. The non-transitory computer-readable storage medium of claim 15, wherein the instructing the generative large language model to create the polymorphic variants of the sample of the malware further comprises:

instructing the generative large language model to generate the polymorphic variants that execute one or more processes of the sample of the malware in a different sequence.

18. The non-transitory computer-readable storage medium of claim 17, wherein the instructing the generative large language model to create the polymorphic variants of the sample of the malware further comprises:

instructing the generative large language model to rewrite one of the one or more processes of the sample of the malware to do a same function in a different way.

19. The non-transitory computer-readable storage medium of claim 18, wherein the one or more processors are further configured to:

analyze the sample of the malware using a semantic analysis model that understands semantics of malware code to classify portions of the sample of the malware as functional or non-functional; and instruct the generative large language model to generate polymorphic variants of the sample of the malware by rewriting at least some of the functional portions of the sample of the malware to perform the same function with alternative code.

20. The non-transitory computer-readable storage medium of claim 15, further comprising:

sending the one or more polymorphic variants to a threat intelligence service, wherein the threat intelligence service analyzes the one or more polymorphic variants to identify a signature for a malware class based on aspects of the sample of the malware and the one or more polymorphic variants that are less likely to change.

\* \* \* \* \*